United States Patent
Chou et al.

(10) Patent No.: US 8,805,176 B1
(45) Date of Patent: Aug. 12, 2014

(54) AUTO-FOCUS DRIVING STRUCTURE

(71) Applicant: Silitech Technology Corp., New Taipei (TW)

(72) Inventors: Chin-Yi Chou, Taipei (TW); Chun-Min Chang, Miaoli County (TW); Teng-Chien Yu, Hsinchu (TW)

(73) Assignee: Silitech Technology Corp., New Taipei (TW)

( * ) Notice: Subject to any disclaimer, the term of this patent is extended or adjusted under 35 U.S.C. 154(b) by 0 days.

(21) Appl. No.: 13/932,058

(22) Filed: Jul. 1, 2013

(51) Int. Cl.
*G03B 3/10* (2006.01)
*G03B 13/34* (2006.01)

(52) U.S. Cl.
USPC .......................................... 396/133

(58) Field of Classification Search
USPC .................. 396/133; 310/12.01, 335
See application file for complete search history.

(56) References Cited

U.S. PATENT DOCUMENTS

| | | | |
|---|---|---|---|
| 7,437,064 B2* | 10/2008 | Seo | 396/75 |
| 7,824,115 B2* | 11/2010 | Shih et al. | 396/529 |
| 8,040,623 B2* | 10/2011 | Shyu et al. | 359/824 |
| 8,253,813 B2* | 8/2012 | Ke | 348/208.5 |
| 2008/0310831 A1* | 12/2008 | Huang et al. | 396/133 |
| 2009/0022487 A1* | 1/2009 | Weng et al. | 396/133 |
| 2010/0165132 A1* | 7/2010 | Tokiwa et al. | 348/208.11 |
| 2012/0082442 A1* | 4/2012 | Kwon et al. | 396/55 |
| 2012/0154928 A1* | 6/2012 | Shinohara | 359/701 |

* cited by examiner

*Primary Examiner* — Clayton E Laballe
*Assistant Examiner* — Warren K Fenwick
(74) *Attorney, Agent, or Firm* — Li & Cai Intellectual Property (USA) Office

(57) ABSTRACT

An auto-focus driving structure for installing a lens has an optical axis. The auto-focus driving structure comprises a main body, a lens retainer, and a driving unit. The lens retainer is movably disposed in the main body. The driving unit includes a coil circuit board and a magnetic group. The coil circuit board has a plurality of printed coils. The plurality of printed coils corresponds to the position of the magnetic group, thus the lens retainer can be selectively moved with respect to a bottom portion of the main body through the driving unit.

15 Claims, 7 Drawing Sheets

AUTO-FOCUS DRIVING STRUCTURE

BACKGROUND OF THE INVENTION

1. Field of the Invention

The instant disclosure relates to an auto-focus driving structure; in particular, to a miniaturized auto-focus driving structure.

2. Description of Related Art

In the conventional auto-focus driving devices, the auto-focus and anti-shake structures use traditional coils along with permanent magnets to drive the lens or the image detector in order to provide auto-focus or compensate for unclear captured images generated by vibrations. However, the traditional coils occupy a large volume and have a complex assembly process, which makes the continuous demand for miniaturized electronic devices more difficult to meet.

To address the above issues, the inventor strives via associated experience and research to miniaturize auto-focus and anti-shake driving structure and presents the instant disclosure, which can effectively improve the limitation described above.

SUMMARY OF THE INVENTION

The object of the instant disclosure is to provide a miniaturized auto-focus driving structure which facilitates assembly.

In order to achieve the aforementioned objects, according to an embodiment of the instant disclosure, the instant disclosure provides an auto-focus driving structure for installing a lens device having an optical axis. The auto-focus driving structure includes a main body, a lens retainer movably disposed in the main body, a movable frame movably disposed in the main body configured beneath the lens retainer, a first driving unit including a coil and a first magnetic group, and a second driving unit including a second magnetic group and a coil circuit board.

Specifically, the coil is configured on the periphery of the lens retainer. The first magnetic group is disposed in the main body correspondingly configured to position of the coil. Furthermore, the lens retainer is displaced relative to the main body and along the optical axis through the first driving unit. The second magnetic group is disposed on the movable frame. In addition, the coil circuit board is configured beneath the movable frame and has a plurality of printed coils correspondingly configured to the second magnetic group. Moreover, the movable frame is displaced relative to the main body along a direction (XY axis) normal to the optical axis through the second driving unit.

In order to achieve the aforementioned objects, according to another embodiment of the instant disclosure, the instant disclosure provides an auto-focus driving structure for installing a lens device having an optical axis. The auto-focus driving structure includes a main body, a lens retainer movably disposed in the main body, and a driving unit including a coil circuit board and a magnetic group. The magnetic group is disposed on the periphery of the lens retainer. The coil circuit board is disposed in the main body enclosing the lens retainer and the magnetic group and has a plurality of printed coils corresponding to the position of the magnetic group. Moreover, the lens retainer is selectively displaced relative to the main body through the driving unit.

In summary, the embodiments of the instant disclosure provide an auto-focus driving structure, which uses thin printed coils to substitute the relatively large traditional coils, such that the auto-focus driving structure can be miniaturized and facilitate assembly. Moreover, since the coil circuit board has a plurality of printed coils such that the control processing unit or control circuitry can precisely control the value of electric current flowing through each of the printed coils. Consequently, the lens retainer is displaced respectively to the bottom portion of the main body with high precision, and provides precise focus and position correction, so as to provide high-precision auto-focus and shake compensation functionalities.

In order to further understand the instant disclosure, the following embodiments and illustrations are provided. However, the detailed description and drawings are merely illustrative of the disclosure, rather than limiting the scope being defined by the appended claims and equivalents thereof.

DETAILED DESCRIPTION OF THE PREFERRED EMBODIMENTS

The aforementioned illustrations and detailed descriptions are exemplarities for the purpose of further explaining the scope of the instant disclosure. Other objectives and advantages related to the instant disclosure will be illustrated in the subsequent descriptions and appended drawings.

First Embodiment

Figure 1:
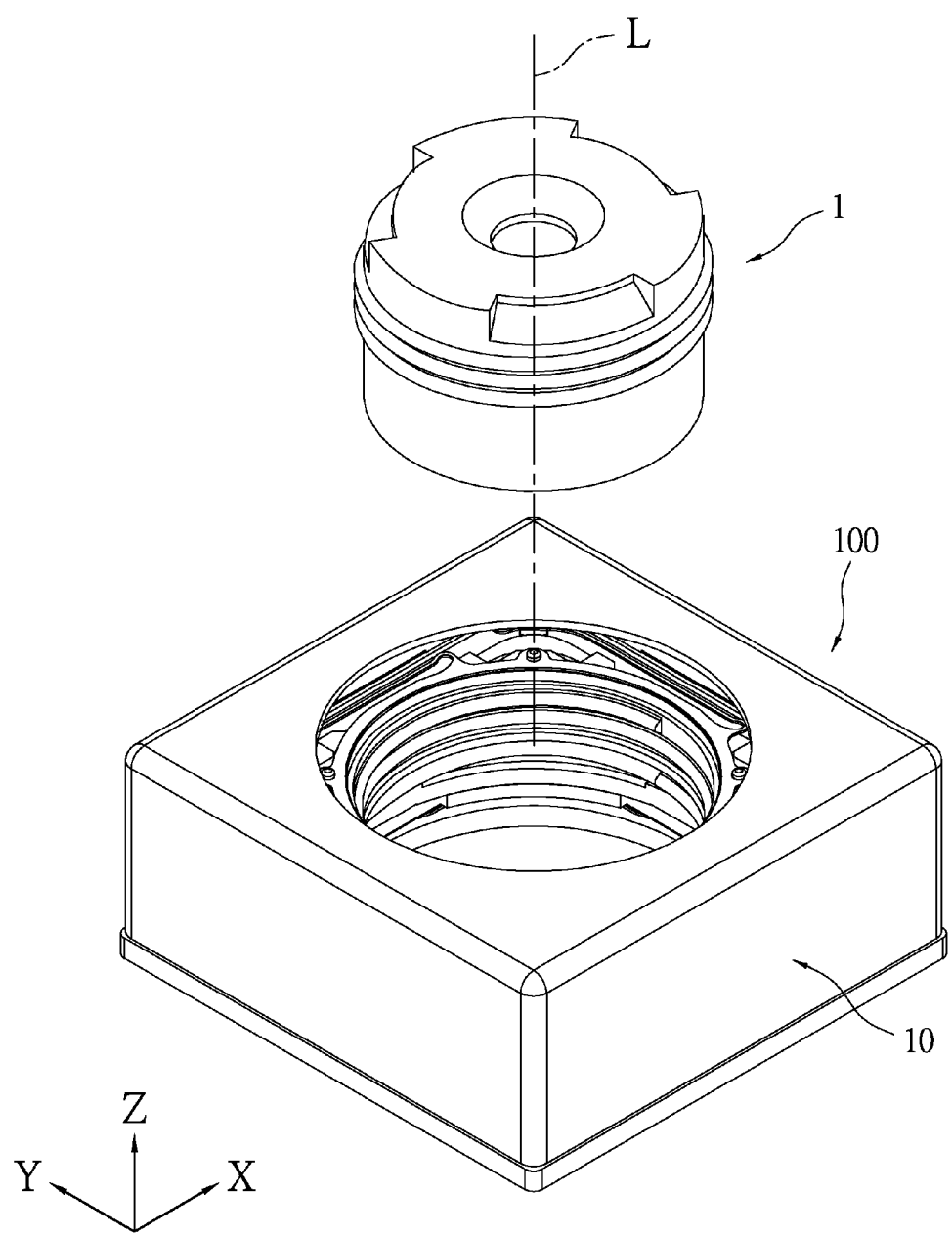
FIG. 1 is an assembled view of an auto-focus driving structure in accordance with the instant disclosure.
Figure 2:
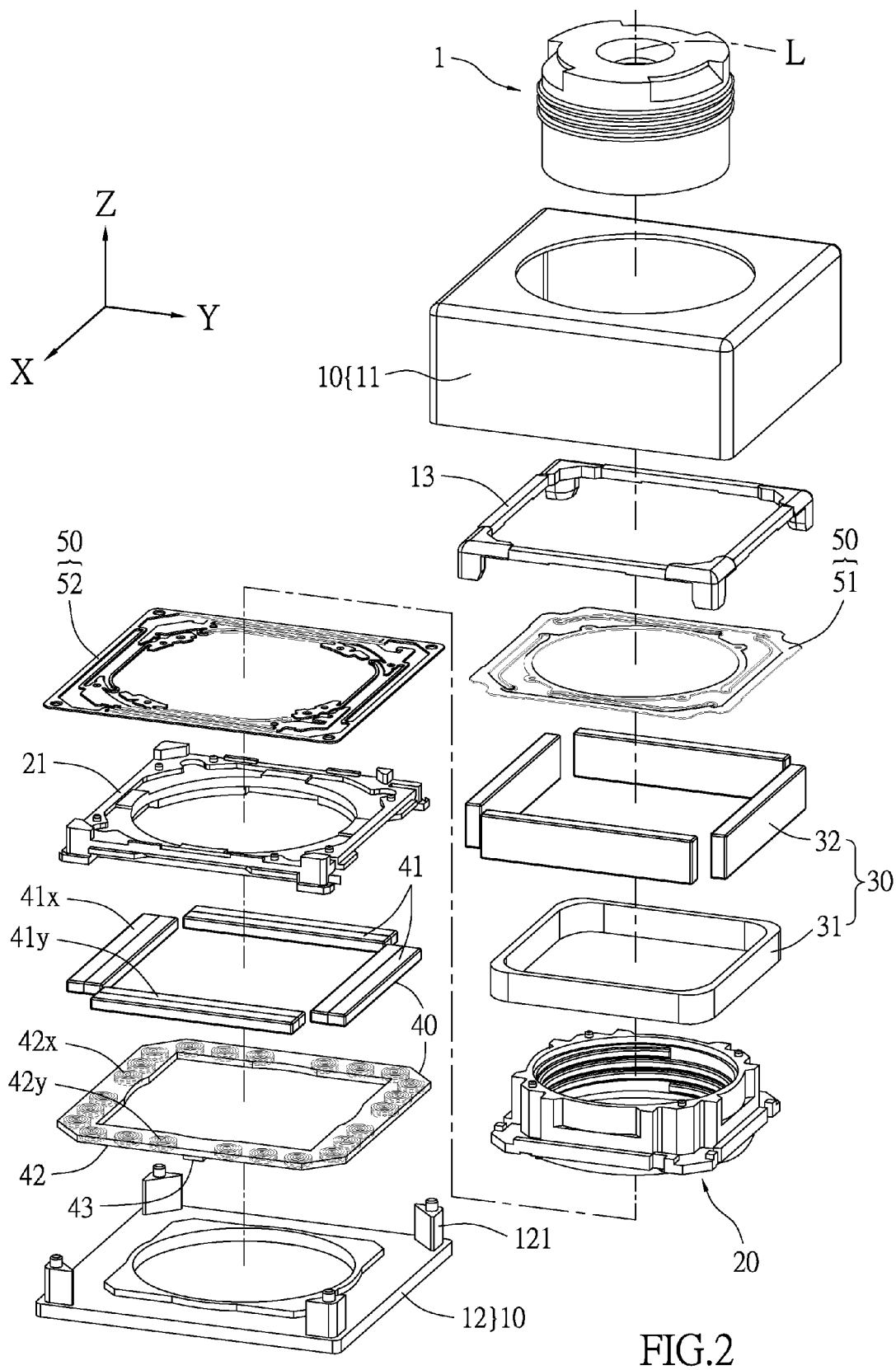
FIG. 2 is an exploded view of the auto-focus driving structure in accordance with the instant disclosure.
Figure 3:
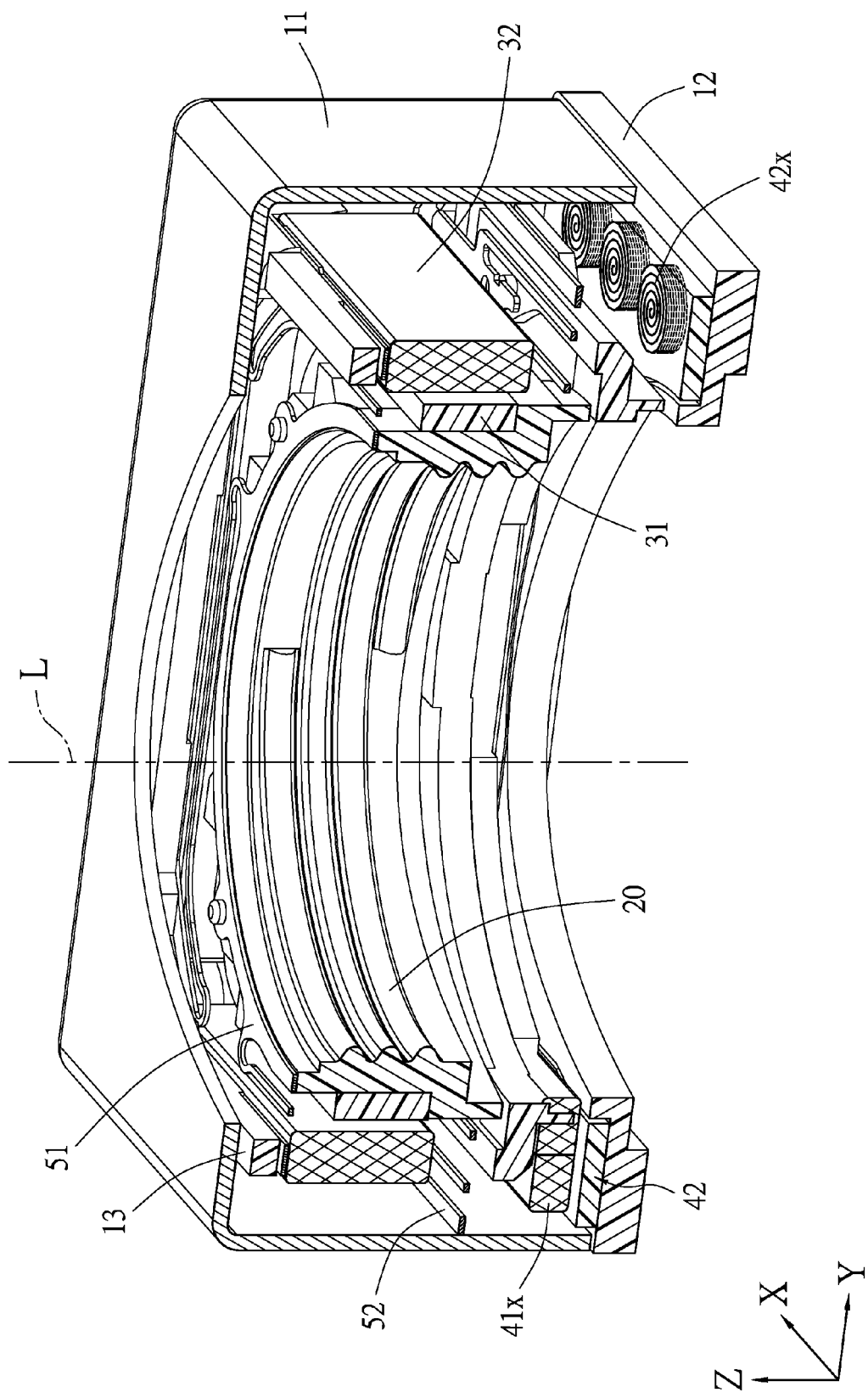
FIG. 3 is a perspective view illustrating a cross-section of the auto-focus driving structure (along the Y-Z axis) in accordance with the instant disclosure.

Please refer to FIG. 1, the instant embodiment provides an auto-focus driving structure 100 for installing a lens 1. Please refer to FIGS. 2 and 3. The auto-focus driving structure 100 of the instant embodiment includes a main body 10, a lens retainer 20, a movable frame 21, a first driving unit 30 and a second driving unit 40.

The main body 10 includes a housing 11 and a base 12. The housing 11 is preferably made of metal or materials alike, the base 12 is preferably made substantially of plastic or materials alike, and the base 12 is assembled to the housing 11 proximate to a bottom portion of the main body 10. The base 12 also includes a plurality of protrusions. The lens retainer 20 is movably disposed in the main body 10. The lens 1 is disposed in the lens retainer 20. The lens 1 and the lens retainer 20 has a common optical axis L, which is defined as the same direction as in the Z-axis (as in the Cartesian coordinate system), while a plane normal to the optical axis L is defined as the plane having an X-axis and a Y-axis (as in the Cartesian coordinate system), and the X, Y, and Z-axis are respectively normal to each other.

The movable frame 21 movably disposed in the main body 10 and configured beneath the lens retainer 20. The center portion of the movable frame 21 may have a compensating lens mounted therein (not shown in figures).

The first driving unit 30 includes a coil 31 and a first magnetic unit 32. The coil 31 is fixed on the periphery of the lens retainer 20. The first magnetic unit 32 preferably includes four magnets. The magnets are configured in the main body 10 corresponding to the position of the coil 31. When the first magnetic unit 32 and the coil 31 interact, the lens retainer 20 can be displaced along the optical axis L (z-axis direction) relative to the bottom portion of the main body 10.

The driving unit 40 includes a second magnetic unit 41 and a coil circuit board 42. The second magnetic unit 41 is configured proximate to the periphery portions of the movable frame 21. The coil circuit board 42 is configured towards the bottom portion of the main body 10. The coil circuit board 42 has a plurality of printed coils $42x$, $42y$. When the printed coils $42x$, $42y$ and the second magnetic group 41 interact, the movable frame 21 is horizontally (along the X and Y axes) displaced relative to the bottom portion of the main body 10. Moreover, an anti-magnetic sheet (not shown in figures) such as an iron sheet can be dispose on the movable frame 21 or towards the bottom of the lens retainer 20 to prevent the first magnetic group 32 and the second magnetic group 41 from magnetically interfering with each other.

Specifically, the first driving unit 30 of the instant embodiment can be for example an auto-focus driving unit. When an electric current flows through the coil 31, an electromagnetic field is generated, which interacts with the magnetic field of the first magnetic group 32. Thusly, an upward driving force is generated such that the lens retainer 20 can be displaced along the optical axis L relative to the bottom portion of the main body 10. In other words, focus adjustments are provided. Upward in the instant embodiment refers to the Z-axis and serves only as an exemplary reference. Furthermore, the second driving unit 40 of the instant embodiment can be for example an anti-shake driving unit. The second magnetic group 41 includes at least one X-axis magnet $41x$ and at least one Y-axis magnet 42Y. The coil circuit board 42 has at least one X-axis printed coil $42x$ corresponding to the X-axis magnet $41x$, and at least one Y-axis printed coil $42y$ corresponding to the Y-axis magnet $41y$. When an electric current flows through the X-axis printed coil $42x$, an electromagnetic field is generated which interacts with the magnetic field of the X-axis magnet $41x$ to create a horizontal (refers to the X and Y directions) driving force. Thusly, the movable frame 21 can be displaced along the X-axis. Alternatively, when an electric current flows through the Y-axis printed coil $42y$, the Y-axis magnet $41y$ interacts with the Y-axis printed coil $42y$ to generate a horizontal (refers to the X and Y directions) driving force such that the movable frame 21 can be displaced along the Y-axis. As a result, the aforementioned displacements offset shaking.

In the instant embodiment, the auto-focus driving structure 100 can also include an elastic member 50 which abuts the lens retainer 20 and the movable frame 21. The elastic member 50 includes an upper elastic member 51 and a lower elastic member 52. The upper elastic member 51 has a fixing outer ring and an elastic inner ring. The elastic inner ring of the upper elastic member 51 abuts the brim of the lens retainer 20. Similarly, the lower elastic member 52 also has a fixing outer ring and an elastic inner ring. The elastic inner ring of the lower elastic member 52 is configured between and abutting a bottom portion of the lens retainer 20 and a top portion of the movable frame 21. Moreover, the main body 10 also includes a frame 13. The frame 13 and the magnetic group 32 can cooperatively press against the fixing outer ring of the upper elastic member 51. The fixing outer ring of the lower elastic member 52 is fixed on the protrusions 121 of the base 12. Via the resilience characteristic of the elastic member 50, the speed in which the displacements (displacements by the driving forces of the first and second driving units 30, 40) of the lens retainer 20 and the movable frame 21 being restored to the respective positions can be enhanced.

The second driving unit 40 of the instant embodiment or the anti-shake driving unit improves upon the traditional large anti-shake coils with the thin printed coils. As a result, the auto-focus driving structure 100 of the instant embodiment is miniaturized which facilitates assembly and efficiently uses space. For example, the displacement sensor 43, which can detect changes in positioning, such as Hall effect sensors, magnetoresistive sensors, magnetic flux sensors, or the sensors alike can be disposed on the coil circuit board 42 corresponding to the position of the magnetic group 41. Alternatively, a control processing unit or control circuitry (not shown in figures) can be integrated on the coil printed circuit 42. Furthermore, the coil printed circuit 42 can be a multi-layered printed circuit board. Consequently, multi-layered printed coils $42x$, $42y$ can be printed along with the printing of each multi-layered printed circuit board. The printed coils $42x$, $42y$ can be stacked and disposed in the coil circuit board 42 in order to increase the intensity of the magnetic field, and simplify assembly.

Second Embodiment

Figure 4:
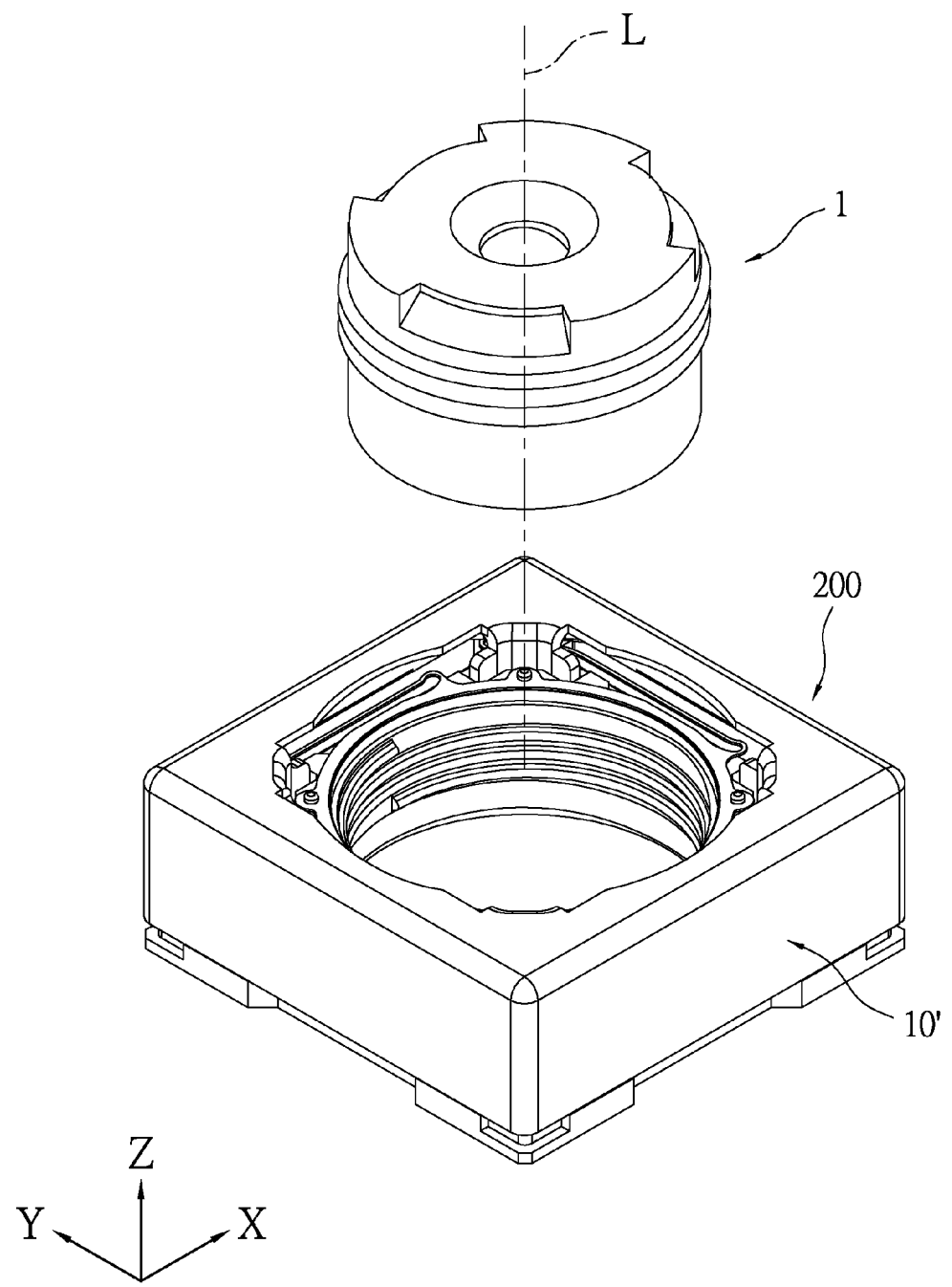
FIG. 4 is an assembled view of the auto-focus driving structure illustrating a second embodiment in accordance with the instant disclosure.
Figure 5:
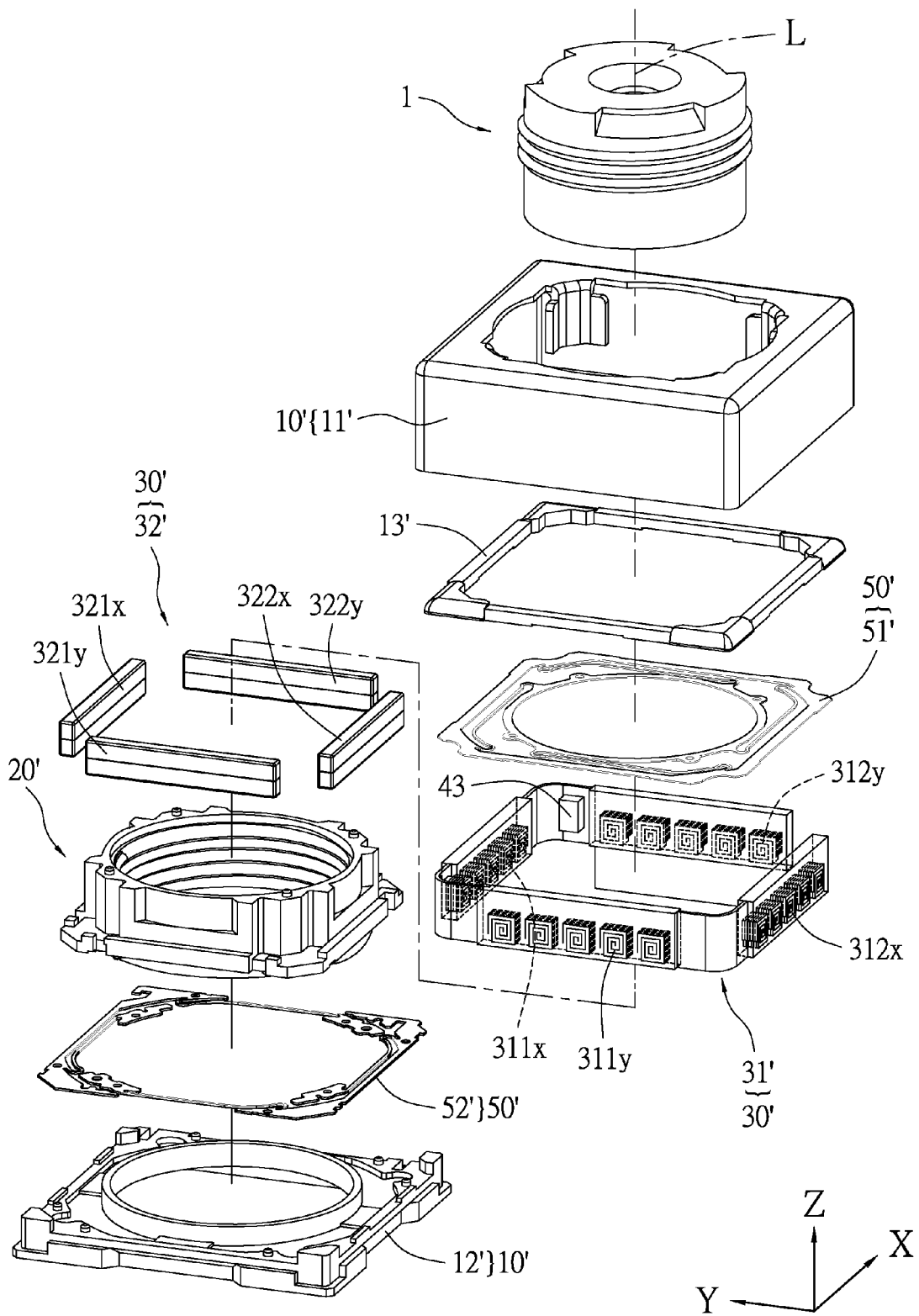
FIG. 5 is an exploded view of the auto-focus driving structure illustrating the second embodiment in accordance with the instant disclosure.
Figure 6:
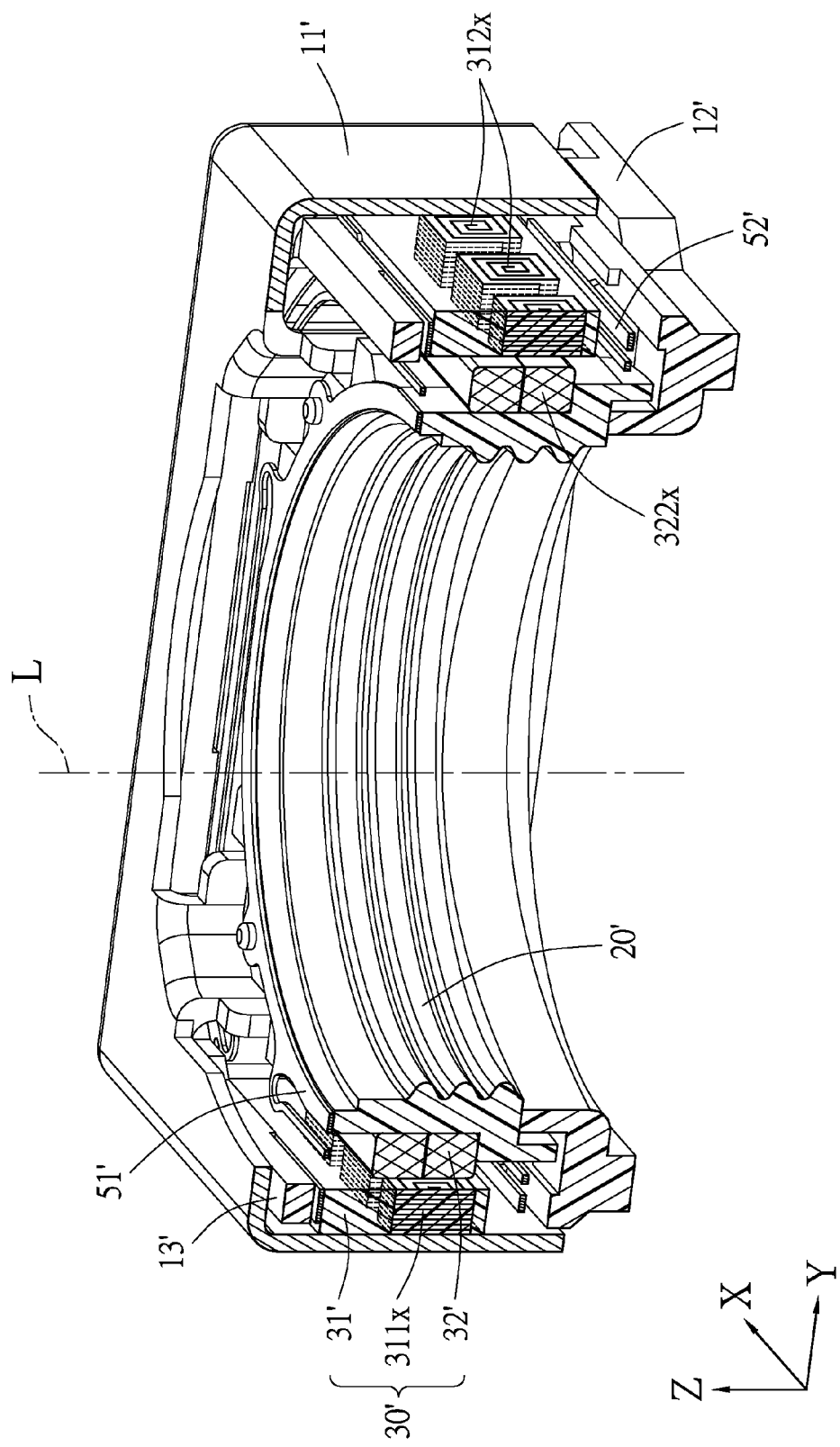
FIG. 6 is a perspective view illustrating a cross-section of the auto-focus driving structure in accordance with the second embodiment of the instant disclosure.

Please refer to FIGS. 4 and 6. The auto-focus driving structure 200 of the instant embodiment includes a main body 10', a lens retainer 20', and a driving unit 30'. The instant embodiment differs from the previous in that, the auto-focus driving structure 200 of the instant embodiment has only one driving unit 30'. The driving unit 30' includes a coil circuit board 31' and a magnetic group 32'. The magnetic group 32' is fixed on the periphery of the lens retainer 20'. The coil circuit board 31' is disposed in the main body 10' enclosing the lens retainer 20' and the magnetic group 32'. The coil circuit board 31' has a plurality of printed coils $311x$, $312x$, $311y$, $312y$ corresponding to the position of the magnetic group 32'.

Figure 7:
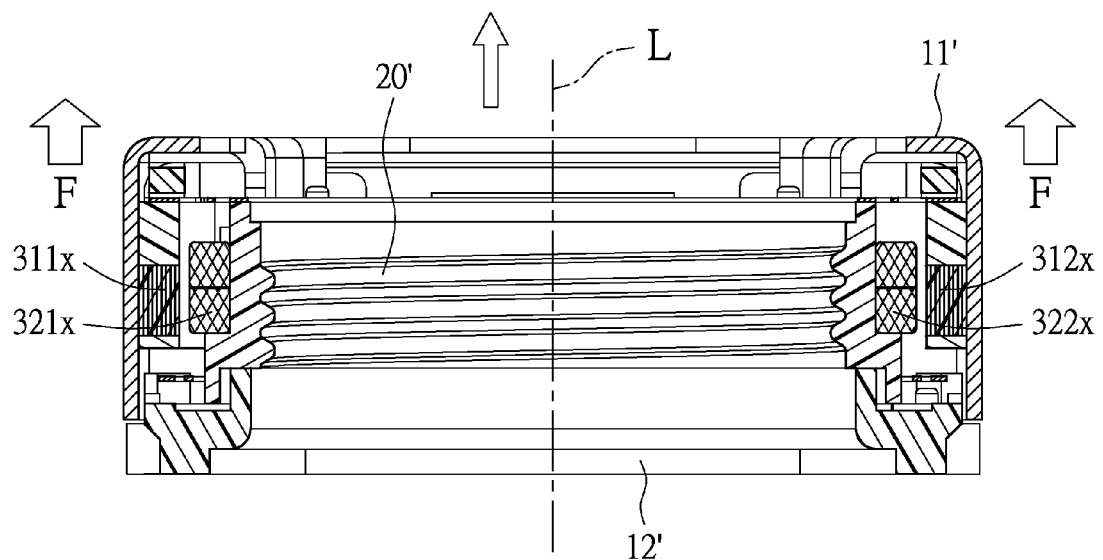
FIG. 7 is a schematic diagram illustrating an operation state of the auto-focus driving structure in accordance with the second embodiment of the instant disclosure.
Figure 8:
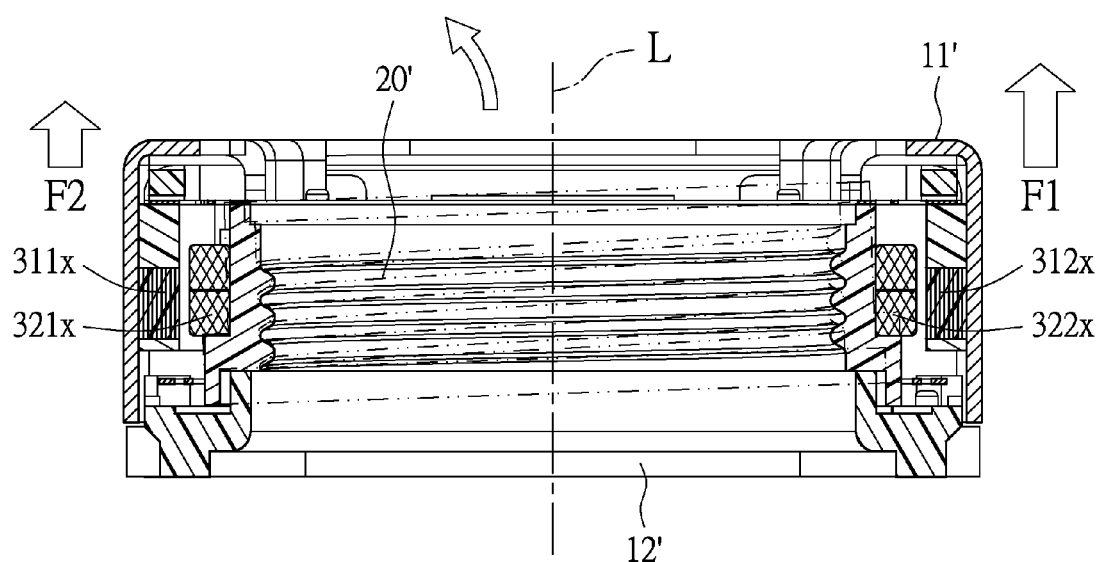
FIG. 8 is another schematic diagram illustrating another operation state of the auto-focus driving structure in accordance with the second embodiment of the instant disclosure.

Specifically, the magnetic group 32' includes at least two X-axis magnets $321x$, $322x$ and two Y-axis magnets $321y$, $322y$. Each X-axis magnet $321x$, $322x$ is aligned parallel along the X axis with respect to each other and normal with respect to each of the Y-axis magnets $321y$, $322y$. The coil circuit board 31' has at least two X-axis printed coil $311x$, $312x$ corresponding to the two X-axis magnets $321x$, $322x$ and at least two Y-axis printed coils $311y$, $312y$ corresponding to two Y-axis magnets $321y$, $322y$. When the same electric current flows through the X-axis printed coils $311x$, $312x$ and the Y-axis printed coils $311y$, $312y$, the lens retainer 20' can displace along the optical axis L relative to the base 12' due to an upward driving force F via magnetic field. Consequently, focal length (as shown in FIG. 7) of the auto-focus driving structure 200 is adjusted. When each of the X-axis printed coils $311x$, $312x$ or Y-axis printed coils $311y$, $312y$ is passed with a different electric current, the lens retainer 20' can tilt along the X-axis or the Y-axis to offset any shaking. Please refer to FIG. 8. When a relatively large electric current flows through the X-axis printed coil $312x$, a relatively larger driving force F1 is generated, and when a relatively smaller current flows through the other X-axis printed coil 311x, a relatively smaller driving force F2 is generated. Since driving force F1 is larger than the driving force F2, the lens retainer 20' can tilt slightly towards the one direction along the X-axis, whereas when the driving force F1 is smaller than the driving force F2, the lens retainer 20' can tilt slightly towards the other direction along the X-axis. Similarly, when the Y-axis printed coils 311y, 312y are passed with different electric current, the lens retainer 20' can tilt along the Y-axis. The lens retainer 20' of the auto-focus driving structure 200 in the instant embodiment can upwardly and downwardly displace along the optical axis L or tilt in the direction of the X and Y axes. The lens retainer 20' can be selectively displaced relative to the bottom portion of the main body 10' such that only one driving unit 30' is necessary to provide anti-shake optical offsetting and auto-focus functions while providing miniaturization. In addition, the coil circuit board 31' of the instant embodiment can be integrated with a displacement sensor 43 which can detect changes in positioning, a control processing unit or control circuitry on the coil circuit board 31'. Thus, providing ease of assembly and efficient use of space.

The instant embodiment uses thin printed coils to substitute the relatively large traditional coils such that a plurality of printed coils can be used. Moreover, with the control processing unit or control circuitry, the value of electric current flowing through each of the printed coils can be precisely controlled according to the data provided by the displacement sensor. Consequently, the lens retainer can be selectively and precisely displaced with respect to the bottom portion of the main body to provide precise focus and position correction, so as to provide high-precision auto-focus and shake compensation functionalities.

The figures and descriptions supra group forth illustrated the preferred embodiments of the instant disclosure; however, the characteristics of the instant disclosure are by no means restricted thereto. All changes, alternations, combinations or modifications conveniently considered by those skilled in the art are deemed to be encompassed within the scope of the instant disclosure delineated by the following claims.

What is claimed is:

1. An auto-focus driving structure for installing a lens device having an optical axis, comprising:
    a main body;
    a lens retainer movably disposed in the main body;
    a movable frame movably disposed in the main body and configured beneath the lens retainer;
    a first driving unit including a coil and a first magnetic group, the coil configured on the periphery of the lens retainer, the first magnetic group disposed in the main body correspondingly configured to the coil, the lens retainer displaced relative to the main body and along the optical axis through the first driving unit; and
    a second driving unit including a second magnetic group and a coil circuit board, the second magnetic group disposed on the movable frame, the coil circuit board configured beneath the movable frame, the coil circuit board having a plurality of printed coils correspondingly configured to the second magnetic group, and the movable frame displaced relative to the main body along an X-axis direction and a Y-axis direction normal to the optical axis through the second driving unit.

2. The auto-focus driving structure as recited in claim 1, wherein the second magnetic group includes at least one X-axis magnet and at least one Y-axis magnet.

3. The auto-focus driving structure as recited in claim 2, wherein the coil circuit board has at least one X-axis printed coil corresponding to the position of the X-axis magnet, and at least one Y-axis printed coil corresponding to the position of the Y-axis magnet.

4. The auto-focus driving structure as recited in claim 1, wherein the main body includes a housing and a base, the base is configured beneath the main body and is assembled to the housing, and the coil circuit board is disposed on the base.

5. The auto-focus driving structure as recited in claim 1 further comprising;
    an elastic member abutting the lens retainer and the movable frame.

6. The auto-focus driving structure as recited in claim 1, wherein the coil circuit board is a multi-layered printed circuit board, and the printed coils are stacked and disposed in the coil circuit board.

7. The auto-focus driving structure as recited in claim 1, wherein the first driving unit is an auto-focus driving unit, and the second driving unit is an anti-shake driving unit.

8. The auto-focus driving structure as recited in claim 1 further comprising;
    a displacement sensor disposed on the coil circuit board corresponding to the position of the magnetic group.

9. An auto-focus driving structure for installing a lens device having an optical axis, comprising:
    a main body;
    a lens retainer movably disposed in the main body; and
    a driving unit including a coil circuit board and a magnetic group, the magnetic group disposed on the periphery of the lens retainer, the coil circuit board disposed in the main body enclosing the lens retainer and the magnetic group, the coil circuit board having a plurality of printed coils, the printed coils corresponding to the position of the magnetic group, and the lens retainer selectively displaced relative to the main body through the driving unit.

10. The auto-focus driving structure as recited in claim 9, wherein the magnetic group includes at least two Y-axis magnets and at least two X-axis magnets aligned normal to the Y-axis magnets.

11. The auto-focus driving structure as recited in claim 10, wherein the coil circuit board has at least two X-axis printed coils and at least two Y-axis printed coils, the X-axis printed coils corresponding to the position of the X-axis magnets, and the Y-axis printed coils corresponding to the position of the Y-axis magnets.

12. The auto-focus driving structure as recited in claim 9 further comprising;
    an elastic member abutting the lens retainer.

13. The auto-focus driving structure as recited in claim 9, wherein the coil circuit board is a multi-layered printed circuit board, and the printed coils are stacked and disposed in the coil circuit board.

14. The auto-focus driving structure as recited in claim 9, wherein the driving unit is an auto-focus and anti-shake driving unit.

15. The auto-focus driving structure as recited in claim 9 further comprising;
    a displacement sensor disposed on the coil circuit board corresponding to the position of the magnetic group.

* * * * *